C. CATE.
AUTOMATIC STOPPING DEVICE FOR GRAPHOPHONES.
APPLICATION FILED APR. 5, 1915.

1,226,749.

Patented May 22, 1917.
3 SHEETS—SHEET 1.

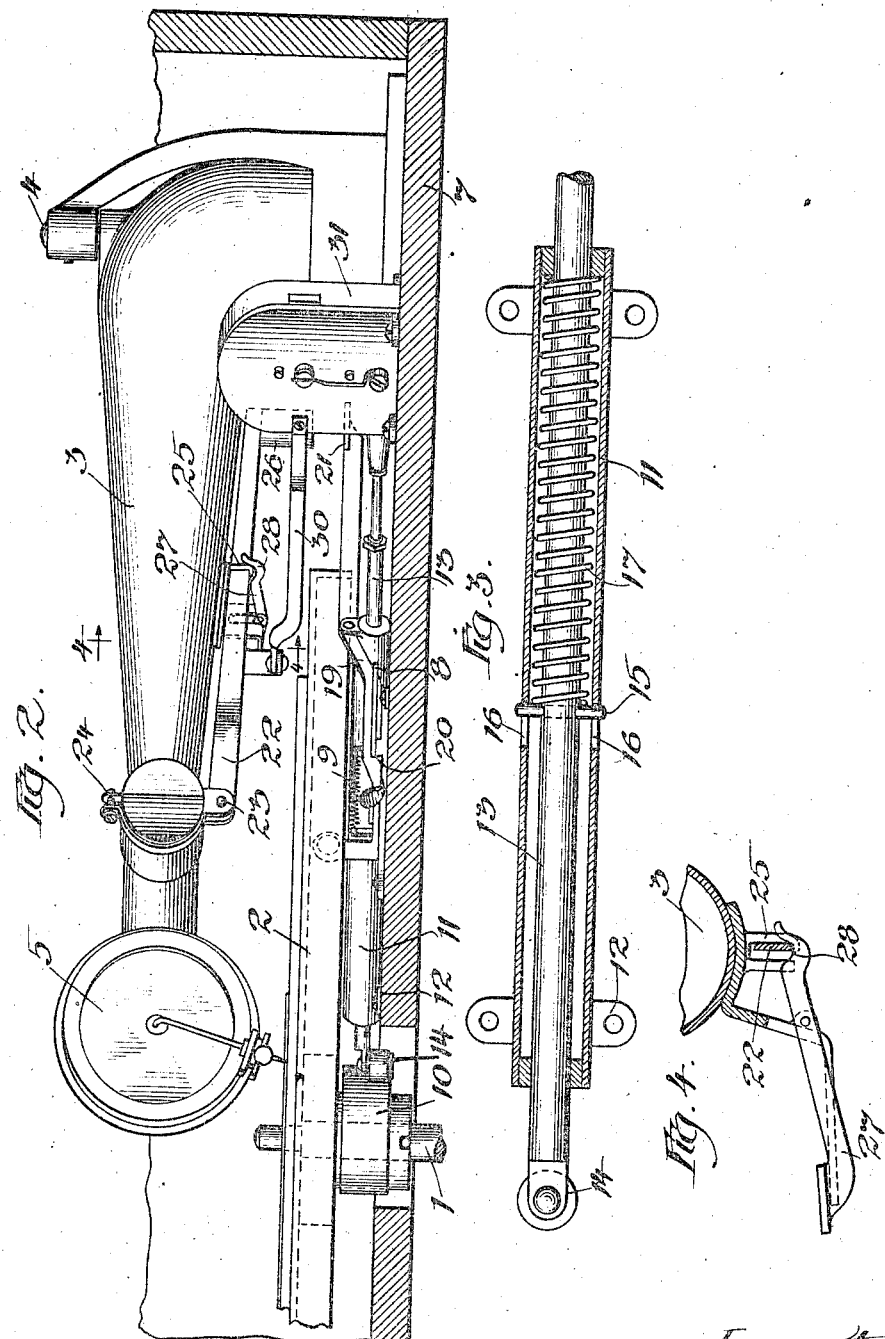

C. CATE.
AUTOMATIC STOPPING DEVICE FOR GRAPHOPHONES.
APPLICATION FILED APR. 5, 1915.
1,226,749.
Patented May 22, 1917.
3 SHEETS—SHEET 3.
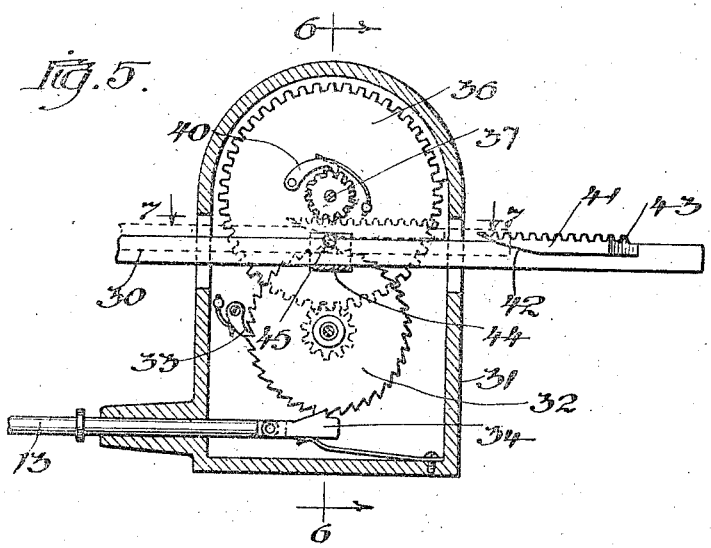
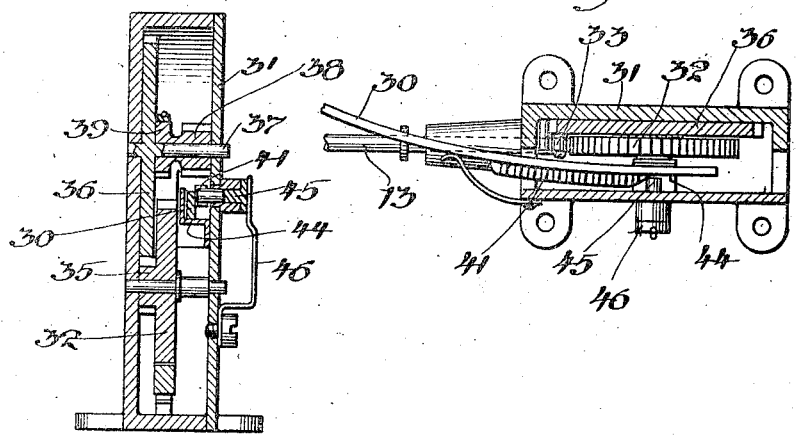
Inventor
C Cate,
By Chamberlin & Brandenburg
Attorneys.

UNITED STATES PATENT OFFICE.

CLARENCE CATE, OF CHICAGO, ILLINOIS, ASSIGNOR TO FRANK F. AKERLY, OF CHICAGO, ILLINOIS.

AUTOMATIC STOPPING DEVICE FOR GRAPHOPHONES.

1,226,749.  Specification of Letters Patent.  Patented May 22, 1917.

Application filed April 5, 1915. Serial No. 19,121.

*To all whom it may concern:*

Be it known that I, CLARENCE CATE, a citizen of the United States, residing at Chicago, county of Cook, State of Illinois, have invented a certain new and useful Improvement in Automatic Stopping Devices for Graphophones, and declare the following to be a full, clear, and exact description of the same, such as will enable others skilled in the art to which it pertains to make and use the same, reference being had to the accompanying drawings, which form a part of this specification.

My invention has for its object to produce a simple and novel attachment for graphophones whereby the record carrying member is stopped when the end of the record is reached.

A subsidiary object of my invention is to produce a device of the character described which may be easily and conveniently attached to machines already in use.

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Fig. 2 is a side elevation of the parts shown in Fig. 1, portions of the casing of the machine being shown in section;

Fig. 3 is an enlarged view of one end of the driving rod with its supporting casing shown in section;

Fig. 4 is a section on an enlarged scale on line 4—4 of Fig. 2;

Fig. 5 is a vertical section through the intermittent driving mechanism between the main driving rod and the remainder of the stop mechanism;

Fig. 6 is a section on line 6—6 of Fig. 5; and

Fig. 7 is a section taken approximately on line 7—7 of Fig. 5 with the parts in the positions indicated in dotted lines in Fig. 5.

Figure 1:
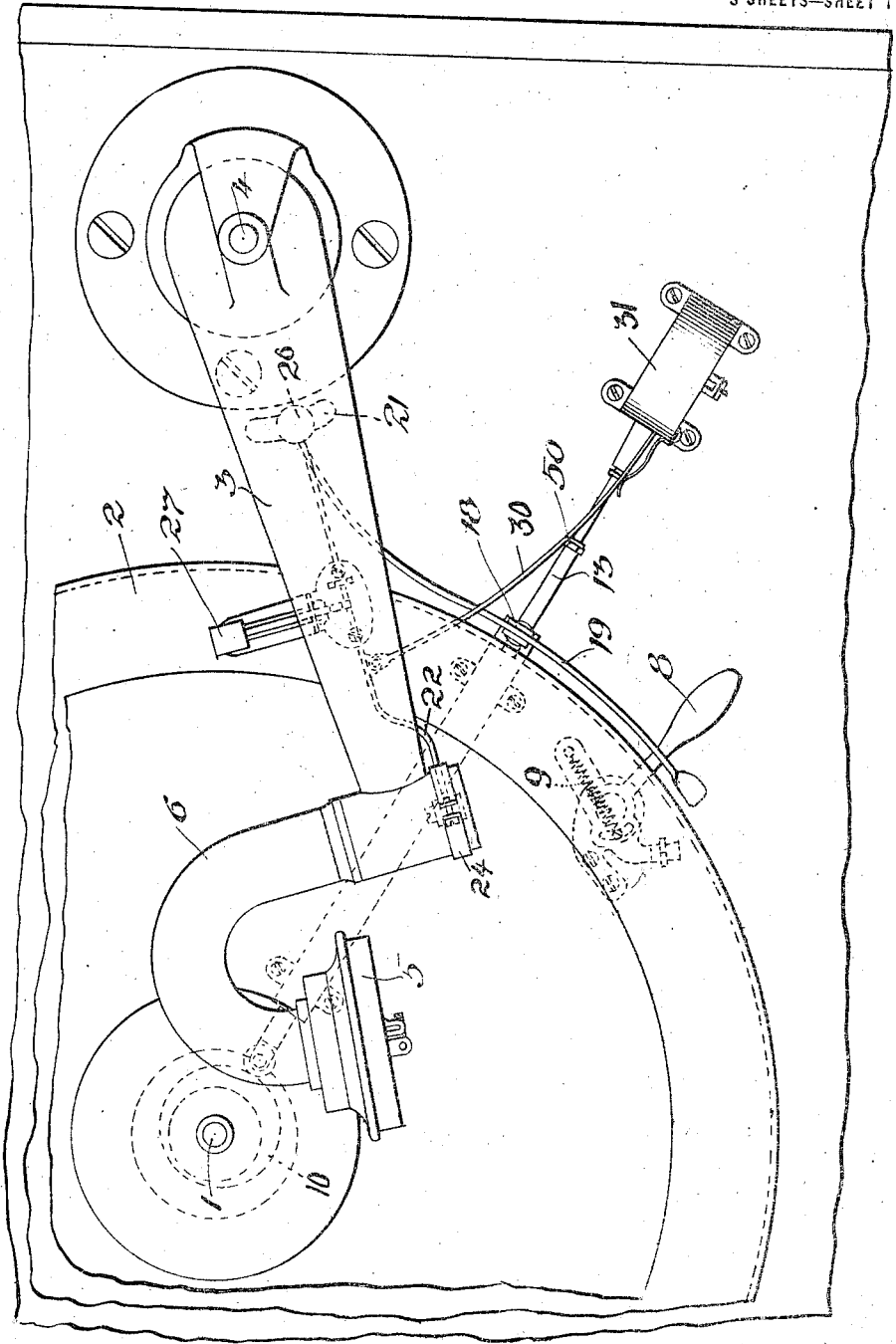
Figure 1 is a top plan view of a fragment of a graphophone having my attachments thereon.

Reference being had to the drawings 1 represents a revoluble vertical shaft having near the upper end a disk-like table, 2, for supporting a record disk. 3 is a reproducer arm mounted so as to swing on vertical trunnions at its outer end, one of the trunnions being indicated at 4. The sound box, 5, is carried upon one end of a hook shaped part, 6, of the reproducer arm arranged to swing about an axis extending at right angles to the axis of the main portion of the arm and thus permitting the sound box to be swung upwardly and rearwardly and be out of the way when the record disks are changed. All of the parts heretofore described, together with the casing 7, a portion of which is illustrated, and the brake or stop handle, 8, are old and well known and are illustrated simply to represent sound reproducing machines in general.

The stop or brake handle, 8, is of the kind that tends, when properly adjusted and set, to assume its braking or stop position, a spring, 9, being provided for this purpose. In accordance with my invention I provide a holding device which is adapted to lock the brake or stop handle in its release position, this device being tripped when the end of a record is reached, and causing the machine to stop. The actual tripping of the holding or catch device is accomplished by parts movable with the reproducer arm, while the tripping devices are set in action through power derived from the motor of the machine.

In the arrangement illustrated, there is placed on the shaft 1, just below the table 2, an eccentric, 10. Upon the top wall or partition of the casing or cabinet lying just below the table 2 is a tube, 11, provided with suitable flanges, 12, which may be screwed down upon said wall or partition, the tube lying radial to the shaft 1. Extending through this tube is the main actuating rod, 13, having on its inner end a roller, 14, engaging with the eccentric. Rotary movement of the rod is prevented by a pin, 15, extending through short slots, 16, in the surrounding tube; while a spring, 17, lying within the tube about the rod tends constantly to hold the roller against the eccentric. The member 11 extends outwardly beyond the edge of the table 2 and is there provided with one or more upwardly projecting ears, 18, upon which is fulcrumed a catch lever, 19, having at one end a hook, 20, in position to engage with the brake handle, 8, when the latter is in its release position while at its other end it is provided with a broad foot, 21, underlying the outer portion of the reproducer arm. Lying underneath the main portion of the reproducer arm and extending in the direction of the length thereof, is a trip lever, 22, hinged at one end as at 23 to a suitable clamp, 24, which may conveniently be slipped upon the transverse part, 6, of the reproducer arm. Fixed to the under side of the reproducer arm is a small hook, 25, which is adapted to underlie an intermediate portion of the lever 22 and hold it raised. On the free end of the lever 22 is a weight, 26. The parts are so proportioned that when the lever 22 is pushed off the hook 25 the weighted end drops down upon the broad foot, 21, of the catch lever so as to release the brake handle of the machine and bring the machine to rest.

The parts are so arranged that when the lever 22 is lifted in proximity to the hook it is placed under a slight lateral tension which will cause it to move laterally a sufficient distance to seat itself firmly upon the hook and be yieldingly held there against accidental displacement.

In order to reset the trip lever 22 automatically whenever a record is changed, I have provided a device for lifting the lever back upon its seat whenever the sound box is swung back. To this end I have supported on the under side of the reproducer arm, in proximity to the member 25, a lever, 27, projecting at its outer end into the path of the sound box or some adjacent member when the sound box is swung back. The inner end of the lever 27, that is the end lying beneath the trip lever 22, is provided with a broad concave seat, 28, in a position to receive and remain in engagement with the lever 22 when the latter is tripped and drops. In other words, when the parts are in the positions indicated in Fig. 2 and the trip lever is pushed from its seat on the member 25 it drops down into the seat 28, swinging the lever 27 about its pivot, the inner end of the lever dropping down and the outer end rising. When a record is to be changed and the sound box is swung back, the weight of the sound box comes upon the outer end of the lever 27 and causes this lever to swing in a direction to raise the trip lever until it is at least high enough to slip upon its supporting seat, whereupon the tension of the lever 22 comes into play and causes the lever to spring laterally upon the seat. Thus the lever 27 is released of the weight of the trip lever and the sound box may be swung into its working position without in any way affecting the trip lever.

The motive power for pushing the trip lever from its seat is supplied by the rod 13 but only at a time when the end of the record is reached. To this end I have extended the rod 13 as well as a connecting rod, 30, which is hinged at one end to the trip lever 22 into what may be termed a selective clutching mechanism arranged within a casing, 31. The clutching mechanism is best shown in Figs. 5, 6 and 7. Within the lower portion of the casing 31 is a ratchet wheel, 32, engaged by a pawl, 33, which prevents backward movement thereof. The outer end of the rod 13 is provided with an actuating pawl, 34, which engages with the ratchet wheel and moves it step by step as the actuating rod is reciprocated. Fixed to the ratchet wheel is a pinion, 35, which meshes with a gear wheel, 36, arranged in the upper portion of the casing and fixed upon its shaft, 37. Loose on the shaft 37 is a pinion, 38, having fixed thereto a small ratchet wheel, 39, which is engaged by a pawl, 40, carried by the gear wheel 36. The result is that the pinion 38 may turn in one direction incidentally to the gear wheel 36, this being in the direction which is the forward direction, corresponding to the direction in which the gear wheel 36 is driven by the actuating rod 13 and intermediate devices. The rod 30 extends through the casing 31 just below the pinion 38 and, on the outer side thereof, at some distance from the end, is a rack bar, 41, having teeth adapted to mesh with the pinion 38. The rack bar is of less depth than the rod 30 and has its front end, 42, wedge shaped as viewed from the side and its rear end, 43, wedge shaped as viewed from the top or bottom. Within the casing below the pinion 38 is a rest, 44, on which the rod 30 is adapted to ride; this rest being far enough below the pinion 38 to permit the rack bar to move clear of the pinion while the member 30 rides on the seat. Projecting through the wall of the casing at a point between the seat 44 and the pinion 38 is a pin, 45, yieldingly pressed inwardly by a spring, 46. The parts are so proportioned that when the rod is in the position shown in full lines in Fig. 5 and is drawn toward the left, the beveled under face, 42, of the rack rides up on the pin 45 lifting the rack and the member 30 and bringing the rack into mesh with the pinion. If the member 30 is moved far enough to the left to allow the rack bar to drop down in front of the pin 45, the member 30 may be pushed back toward the right without bringing the rack into engagement with the pinion because the beveled rear end, 43, of the rack bar will push the pin 45 outwardly so as to allow the member 30 to move back while resting on the seat 44.

When the parts are assembled, as illustrated, and the machine is started, the gradual swinging of the reproducer arm carries the rod 30 slowly in the direction to withdraw it from the casing 31, while upon each revolution of the record disk, the driving rod 13 moves the gearing of the selective clutch mechanism forward a step. When the rack 41 is in engagement with the pinion 38, it will be driven by the pinion at the same speed that it is carried by the reproducer arm during the playing of the record. Furthermore, the parts are so proportioned that whenever the end of a record is reached, the rack 41 will be found meshing with the pinion 38; the rack being long enough to compensate for different lengths of records so that when the record is a short one, the teeth at the front end of the rack will engage with the pinion when the end of the record is reached, while, with a longer record, the teeth toward the rear end of the rack will be found in mesh with the pinion when the end of the record is reached. As I have heretofore said, as long as the record is being played, and the reproducer arm is swinging slowly toward the center of the disk, the engagement of the rack with the pinion produces no other result; but, when the end of the record is reached, and the needle no longer travels toward the center of the disk, the reproducer arm comes to rest and any further forward movement of the rod 30 is from the rear end through the rack and pinion and not from the other end. Consequently, the rod 30 will be driven forward by the rack and pinion and the trip lever 22 will be pushed from its seat on the member 25 and will drop down so as to disengage the catch lever and allow the brake to be applied. Thereafter when the record disk is changed, the sound box is swung back out of the way and resets the trip lever in the manner heretofore described. The reproducer arm is then swung as a whole far enough to allow the rear end of the rack bar 41 to drop down in front of the pin 45 and bring the rod 30 upon the seat or shelf 44, whereupon the reproducer arm may be swung back to bring the needle to the starting point, the rod 30 traveling back through the clutch device to the position shown in full lines in Fig. 5. Then when the new record has been placed in position and the sound box swung down, the controlling handle, 8, is shifted to its release position and is immediately caught and held by the catch lever 19; so that the machine will run until the entire record is played, whereupon it will again be stopped in the manner heretofore explained.

In order that the attachments may be placed on machines of any desired type, I prefer to make the actuating rod 13 in at least two pieces, there being a joint, 50, in the rod near the point where it emerges from the tubular supporting casing 11. This permits the attachments to be placed upon machines having a hinged top without making it necessary to dismantle the attachments when the top is swung back; all that is required being the unjointing of the actuating rod at the joint 50 before the top is swung back.

It will be seen that all of the attachments in the particular embodiment illustrated are of a kind which permits them to be applied readily to existing machines without making any changes in the machines themselves, and without requiring special tools except a screw driver for the purpose of screwing the several casings in place and attaching the parts carried by the reproducer arm to the latter.

While I have illustrated and described only a single form of my invention which has been successfully used on one type of graphophone, I do not desire to be limited to the particular structural details illustrated and described or, broadly speaking, to any particular kind of graphophone as it will be evident that various changes in details may be made to adapt the attachments to machines differing from each other in construction; and I intend to cover all forms and arrangements which come within the terms employed in the definitions of my invention constituting the appended claims.

I claim:

1. In a stopping mechanism for a graphophone, the combination with a traveling arm and a member movable relatively thereto, of a controller movable in unison with the said arm, an actuator for said controller, and means driven by the aforesaid member for moving said actuator during normal running of the machine at the same speed and in the same direction as the controller is carried by the said arm while the latter is advancing.

2. In a stopping mechanism for a graphophone, the combination with a traveling arm and a member movable relatively thereto, of a controlling lever mounted on and movable with the said arm, an actuator for said lever, and means driven by the aforesaid member for moving the actuator at the same speed and in the same direction as that in which the lever is being carried by the said arm while the latter is advancing.

3. In a stopping mechanism for a graphophone, the combination with a traveling arm and a member movable relatively thereto, of a device mounted on and movable with the said arm, a driving element for said device movable back and forth, means associated with the aforesaid member for actuating said driving element, and selective clutch mechanism for automatically connecting said element to the aforesaid device and moving the latter relatively to said arm.

4. In a stopping mechanism for a graphophone, the combination with a traveling arm and a member movable relatively thereto, of a device movable in unison with the said arm, a gear wheel, an actuator for said device in the form of a rack bar adapted to mesh with said gear wheel, and means associated with the aforesaid member for driving said gear wheel at such a speed as to move the rack bar forward at the same speed that the aforesaid device is carried by the said arm while the latter is advancing.

5. In a stopping mechanism for a graphophone, the combination with a traveling arm and a member movable relatively thereto, of a lever movable in unison with the said arm, a gear wheel, a rack bar connected at one end to said lever and adapted to mesh with said gear wheel, and means actuated by the aforesaid member for turning the gear wheel at such a rate as to move the rack forward at the same speed as that at which the lever travels while the said arm is advancing.

6. In a stopping mechanism for a graphophone, the combination with a traveling arm and a member movable relatively thereto, of an actuator mounted at one end on the said arm and having rack teeth at its other end, a gear wheel, means for supporting the gear wheel beside the actuator in position to mesh with the teeth thereon in predetermined relative positions of the parts, and means driven by the aforesaid member for rotating said gear wheel at such a speed as to cause the actuator to be moved forward at the same speed as that at which it is being carried by the said arm while the latter is advancing.

7. In a stopping mechanism for a graphophone, the combination with a traveling arm and a member movable relatively thereto, of an actuator movably mounted at one end on the said arm and projecting therefrom at its opposite end, and means acting on the projecting end of said actuator and driven by the aforesaid member for moving the actuator forward at the same speed and in the same direction as that in which it is being carried by the said arm when the latter is advancing.

8. In a stopping mechanism for a graphophone, a traveling arm, an element movably mounted on the end of said arm, a member movable relatively to said arm, a controller mounted on and movable with the said arm, an actuator for said controller, means driven by the aforesaid member for moving said actuator during normal running of the machine at the same speed and in the same direction as that at which the controller is carried by the said arm while the latter is advancing, whereby the controller is adapted to be automatically operated when the said arm comes to rest while the machine is running, and means mounted on the said arm for resetting the controller when the aforesaid element is raised.

9. In a stopping mechanism for a graphophone, the combination with a traveling arm and a member movable relatively thereto, of a device movable in unison with the said arm, a driving element for said device movable back and forth, means associated with the aforesaid member for actuating said driving element, and selective clutch mechanism for automatically connecting said element to the aforesaid device and moving the latter.

10. In a stopping mechanism for a graphophone, the combination with a traveling arm and a member movable relatively thereto, an actuator, a yieldable connection between one end of the actuator and said arm for causing the actuator to be moved by the arm, and means acting on the other end of said actuator and driven by the aforesaid member for moving the actuator forward at the same speed and in the same direction as that in which it is carried by said arm when the latter is advancing.

11. In a stopping mechanism for a graphophone, the combination with a traveling arm and a member movable relatively thereto, a device movable in unison with said arm, rack teeth on one end of said device, a gear wheel in proximity to said rack teeth, means for adjusting said device and said gear wheel transversely of the axis of the latter a sufficient distance to permit the teeth to be brought into and out of mesh with each other, and means actuated by the aforesaid member for turning the gear wheel at such a rate as to move the aforesaid device forward at the same speed as that at which it travels while said arm is advancing.

12. In a stopping mechanism for a graphophone, the combination with a traveling arm and a member movable relatively thereto, of controlling means movable in unison with said arm and including a rack bar, a gear wheel arranged adjacent to said rack bar, means actuated by the aforesaid member for turning said gear wheel, and guide devices for said rack bar constructed and arranged to cause it to mesh with the pinion when moved in one direction and permit it to move in the opposite direction while out of mesh with the pinion.

In testimony whereof, I sign this specification.

CLARENCE CATE.